United States Patent
Kim et al.

(10) Patent No.: US 8,908,628 B2
(45) Date of Patent: Dec. 9, 2014

(54) METHOD AND APPARATUS FOR RECEIVING DOWNLINK SIGNALS

(75) Inventors: Hakseong Kim, Anyang-si (KR); Hanbyul Seo, Anyang-si (KR); Kijun Kim, Anyang-si (KR); Byounghoon Kim, Anyang-si (KR); Daewon Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 113 days.

(21) Appl. No.: 13/696,935

(22) PCT Filed: May 11, 2011

(86) PCT No.: PCT/KR2011/003454
§ 371 (c)(1),
(2), (4) Date: Dec. 20, 2012

(87) PCT Pub. No.: WO2011/142576
PCT Pub. Date: Nov. 17, 2011

(65) Prior Publication Data
US 2013/0114539 A1    May 9, 2013

Related U.S. Application Data

(60) Provisional application No. 61/333,520, filed on May 11, 2010, provisional application No. 61/333,261, filed on May 11, 2010.

(51) Int. Cl.
| | | |
|---|---|---|
| H04B 7/14 | (2006.01) | |
| H04J 1/10 | (2006.01) | |
| H04J 3/08 | (2006.01) | |
| H04W 4/00 | (2009.01) | |
| H04J 3/00 | (2006.01) | |
| H04L 1/00 | (2006.01) | |
| H04L 5/00 | (2006.01) | |
| H04W 72/04 | (2009.01) | |
| H04W 72/12 | (2009.01) | |

(52) U.S. Cl.
CPC .......... *H04W 72/042* (2013.01); *H04L 1/0091* (2013.01); *H04L 1/0061* (2013.01); *H04L 5/0053* (2013.01); *H04W 72/1289* (2013.01); *H04L 1/0072* (2013.01); *H04L 5/0007* (2013.01)
USPC ............ 370/329; 370/315; 370/328; 370/336

(58) Field of Classification Search
None
See application file for complete search history.

(56) References Cited

U.S. PATENT DOCUMENTS

| | | | | |
|---|---|---|---|---|
| 2010/0254329 | A1* | 10/2010 | Pan et al. ........................ | 370/329 |
| 2011/0085513 | A1* | 4/2011 | Chen et al. ..................... | 370/330 |
| 2011/0243059 | A1* | 10/2011 | Liu et al. ........................ | 370/315 |

OTHER PUBLICATIONS

R1-093384, "DL backhaul physical channel design for Type I relay", 3GPP TSG-RAN WG1 Meeting #58, Schenzhen, China, Aug. 24-Aug. 28, 2009 (Aug. 18, 2009).

(Continued)

*Primary Examiner* — Faruk Hamza
*Assistant Examiner* — Diane Lo
(74) *Attorney, Agent, or Firm* — Mckenna Long & Aldridge LLP

(57) ABSTRACT

The present invention relates to a method and apparatus for receiving downlink signals in a wireless communication system. More specifically, the present invention relates to a method for receiving downlink signals in a wireless communication and an apparatus incorporating the same, wherein the method comprises the steps of: receiving a sub frame having two slots; blind decoding a plurality of R-PDCCH (Relay Physical Downlink Control Channel) candidates in order to receive control data from the search space of a first slot; and determining whether the R-PDCCH conveys control data for downlink transmission or uplink transmission when R-PDCCH was detected in the search space, wherein the control data for the downlink transmission and uplink transmission have an equal size of data.

6 Claims, 14 Drawing Sheets

(56) References Cited

OTHER PUBLICATIONS

3GPP TS 36. 212 v9.1.0, Mar. 2010 (Mar. 30, 2010), $3^{rd}$ Generation Partnership Project; Technical Specification Group Radio Access Network; Evolved Universal Terrestrial Radio Access (E-UTRA); Multiplexing and channel coding (release 9).

R1-102634, "Considerations on R-PDCCH design", 3GPP TSG-RAN WG1 Meeting #61, Montreal, Canada, May 10-14, 2010 (May 5, 2010).

R1-102700, "Backhaul Control Channel Design in Downlink", 3GPP TSG-RAN WG1 Meeting #61, Montreal, Canada, May 10-14, 2010 (May 7, 5010).

* cited by examiner (a)

| 0/1A | L/D VRB | ceil(log2(N/(N+1)/2)) | MCS (5bit) | HARQ(3bit) | NDI | RV(2bit) | TPC(2bit) |

(a) DL grant (DCI, format 1A)

| 0/1A | L/D VRB | N_UL_hop (1 or 2bit) | ceil(log2(N/(N+1)/2)) | MCS/RV (5bit) | NDI | TPC(2bit) | DM RS CS(3bit) | CQI req. | ZP |

(b) UL grant (DCI, format 0) at 1st slot

| 0/1A | FH | N_UL_hop (1 or 2bit) | ceil(log2(N/(N+1)/2)) | MCS/RV (5bit) | NDI | TPC(2bit) | DM RS CS(3bit) | CQI req. |

(c) UL grant (DCI, format 0) at 2nd slot

METHOD AND APPARATUS FOR RECEIVING DOWNLINK SIGNALS

This Application is a 35 U.S.C. §371 National Stage Entry of International Application No. PCT/KR2011/003454, filed May 11, 2011 and claims the benefit of U.S. Provisional Application Nos. 61/333,261, filed May 11, 2010 and 61/333,520, filed May 11, 2010, all of which are incorporated by reference in their entirety herein.

TECHNICAL FIELD

The present invention relates to a wireless communication system, and more particularly to a method and apparatus for receiving downlink signals.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

Accordingly, the present invention is directed to a method and apparatus for receiving downlink signals that substantially obviate one or more problems due to limitations and disadvantages of the related art. An object of the present invention is to provide a method and apparatus for efficiently using downlink resources in a wireless communication system.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for receiving a downlink signal in a wireless communication system including: receiving a subframe including two slots; performing blind decoding (BD) of a plurality of Relay Physical Downlink Control Channel (R-PDCCH) candidates so as to receive control information in a search space of a first slot; and if the R-PDCCH is detected in the search space, determining whether the R-PDCCH carries either control information for downlink transmission or control information of uplink transmission, wherein the control information for downlink transmission has the same size as the control information for uplink transmission.

In another aspect of the present invention, a communication device configured to receive downlink signals in a wireless communication system includes: a radio frequency (RF) unit; and a processor, wherein the processor receives a subframe including two slots; performs blind decoding (BD) of a plurality of Relay Physical Downlink Control Channel (R-PDCCH) candidates so as to receive control information in a search space of a first slot; and if the R-PDCCH is detected in the search space, determining whether the R-PDCCH carries either control information for downlink transmission or control information of uplink transmission, wherein the control information for downlink transmission has the same size as the control information for uplink transmission.

The control information for downlink transmission and the control information for uplink transmission may be distinguished from each other by indication information contained in downlink control information (DCI).

The control information for downlink transmission and the control information for uplink transmission may be distinguished from each other by a Radio Network Temporary Identifier (RNTI) masked to a Cyclic Redundancy Check (CRC) of downlink control information (DCI).

The method may further include: if the control information for uplink transmission is not detected in the first slot, performing blind decoding (BD) of a plurality of R-PDCCH candidates so as to receive the control information for uplink transmission in a search space of a second slot.

Advantageous Effects

Exemplary embodiments of the present invention have the following effects. In accordance with the embodiments of the present invention, downlink resources can be efficiently used in a wireless communication system.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 16 is a diagram illustrating a UL grant (format 0) and a DL grant (format 1A).

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies such as, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMaX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. LTE-Advanced (LTE-A) is an evolved version of 3GPP LTE.

Although the following embodiments of the present invention will hereinafter describe inventive technical characteristics on the basis of the 3GPP system, it should be noted that the following embodiments will be disclosed for illustrative purposes only and the scope and spirit of the present invention are not limited thereto.

Figure 1:
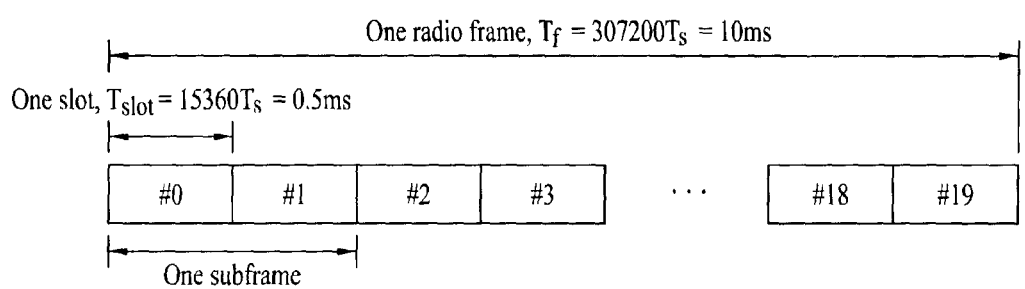
FIG. 1 exemplarily shows a radio frame structure for use in a 3rd Generation Partnership Project (3GPP) system.

FIG. 1 illustrates a radio frame structure for use in the 3GPP system.

Referring to FIG. 1, the radio frame has a length of 10 ms (327200×$T_s$) and includes 10 subframes of equal size. Each subframe has a length of 1 ms and includes two slots. Each slot has a length of 0.5 ms (15360*$T_s$). In this case, $T_s$ represents sampling time, and is expressed by '$T_s$=1/(15 kHz× 2048)=3.2552×$10^{-8}$ (about 33 ns)'. The slot includes a plurality of OFDM symbols in a time domain, and includes a plurality of resource blocks (RBs) in a frequency domain. In the LTE system, one resource block includes twelve (12) subcarriers×seven (or six) OFDM (Orthogonal Frequency Division Multiplexing) symbols. The aforementioned structure of the radio frame is only exemplary, and various modifications can be made to the number of subframes contained in the radio frame or the number of slots contained in each subframe, or the number of OFDM symbols in each slot.

Figure 2:
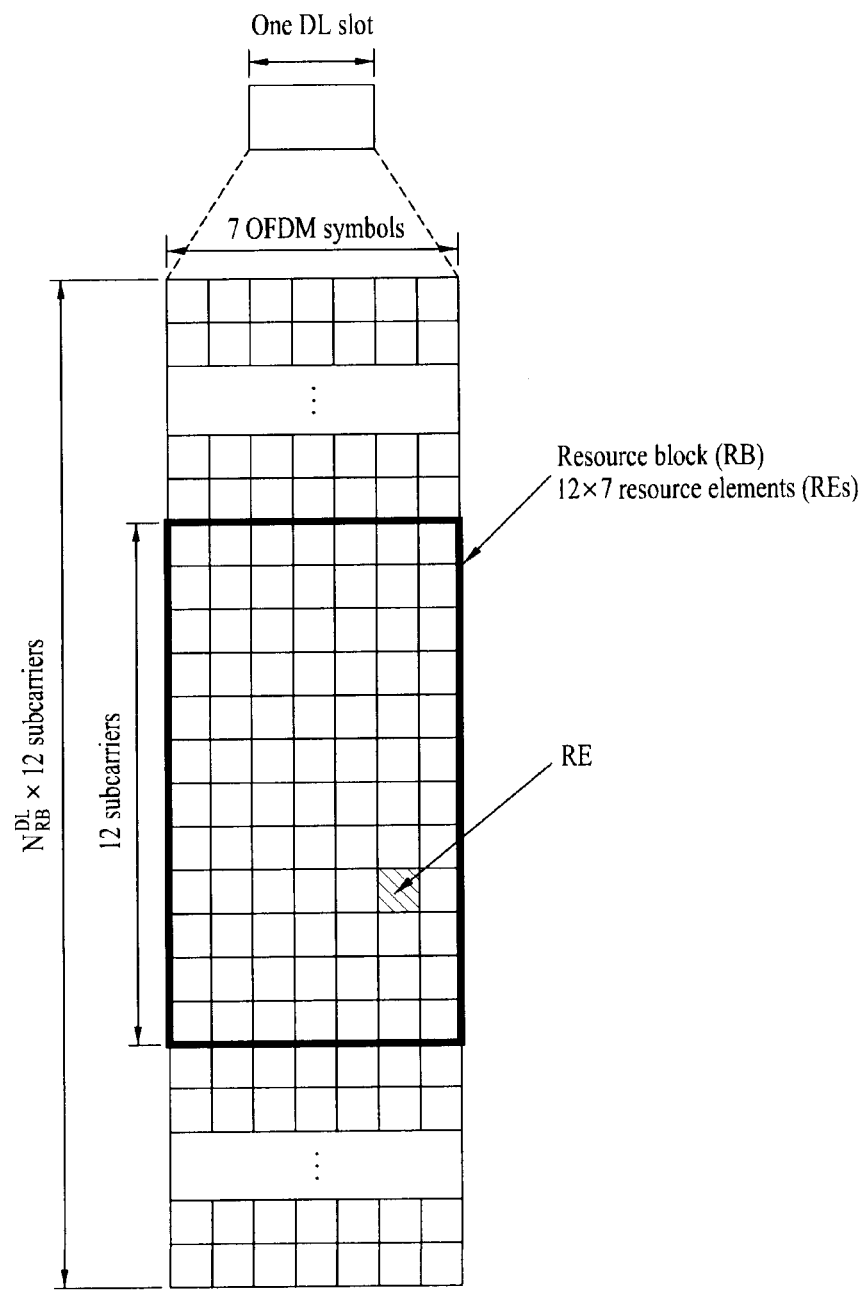
FIG. 2 exemplarily shows a resource grid of a downlink (DL) slot.

FIG. 2 illustrates a resource grid for a downlink slot.

Referring to FIG. 2, a downlink slot includes a plurality of OFDM symbols (for example, 7 OFDM symbols) in a time domain, and includes $N_{RB}^{DL}$ resource blocks in a frequency domain. Each resource block (RB) includes 12 subcarriers, such that a downlink slot includes ($N_{RB}^{DL}$×12) subcarriers. Although FIG. 2 illustrates that a downlink slot includes 7 OFDM symbols and a resource block (RB) includes 12 subcarriers, the scope or spirit of the present invention is not limited thereto and other examples can also be applied to the present invention. For example, the number of OFDM symbols contained in a downlink slot may be changed according to Cyclic Prefix (CP) length. Each element on a resource grid may be defined as a resource element (RE). The RE represents minimum time/frequency resources defined in a physical channel, and is indicated by a single OFDM symbol index or a single subcarrier index. One RB may include ($N_{symb}^{DL}$× $N_{sc}^{RB}$) resource elements (REs). $N_{symb}^{DL}$ is the number of OFDM symbols contained in a downlink slot, and $N_{sc}^{RB}$ is the number of subcarriers contained in a resource block (RB). The number ($N_{RB}^{DL}$) of RBs contained in a downlink slot is dependent upon a downlink transmission bandwidth established in a cell.

The downlink slot structure of FIG. 32 may be equally applied to an uplink slot structure. However, the uplink slot structure includes SC-FDMA symbols instead of OFDM symbols.

Figure 3:
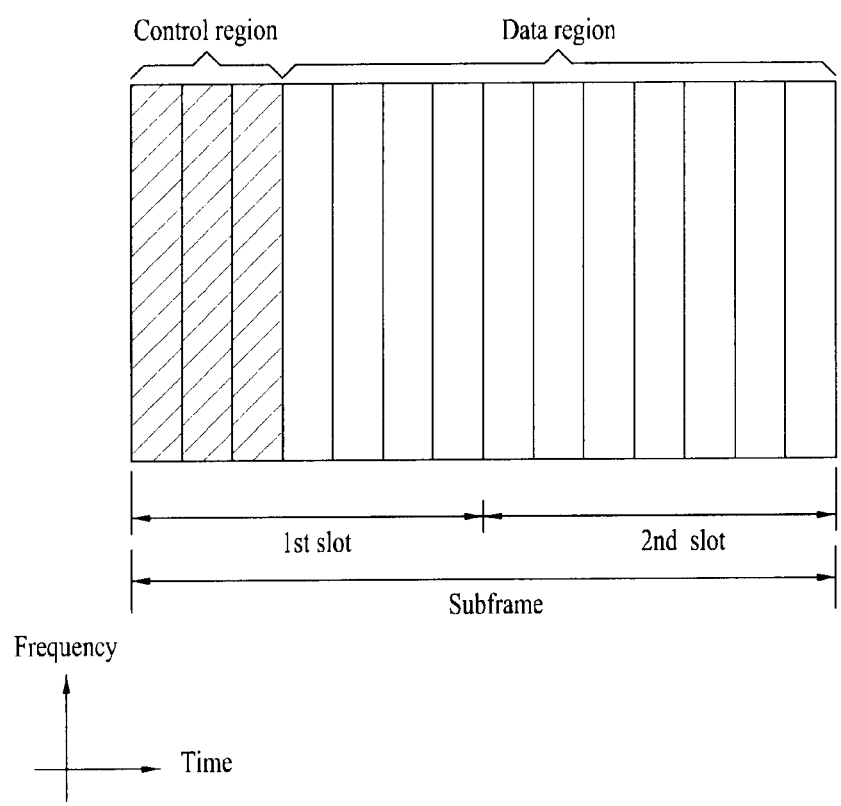
FIG. 3 exemplarily shows a downlink (DL) frame structure.

FIG. 3 exemplarily illustrates a downlink subframe structure for use in a 3GPP system.

Referring to FIG. 3, one or more OFDM symbols located in the front of the subframe are used as a control region, and the remaining OFDM symbols are used as a data region. The size of the control region may be independently established for each subframe. The control region may be adapted to transmit scheduling information and other L1/L2 control information. The control channel includes a Physical Control Format Indicator CHannel (PCFICH), a Physical Hybrid-automatic repeat request (ARQ) Indicator CHannel (PHICH), a Physical Downlink Control CHannel (PDCCH), and the like. The traffic channel includes a Physical Downlink Shared CHannel (PDSCH).

PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the eNB and the UE may transmit and receive data other than either specific control information or specific service data through the PDSCH. Control information transmitted through the PDCCH is referred to as downlink control information (DCI). The DCI transports uplink resource allocation information, downlink resource allocation information, or uplink transmission power control (TPC) commands for UE groups. The eNB determines a PDCCH format according to a DCI to be sent to the UE, and attaches a Cyclic Redundancy Check (CRC) to control information. A unique identifier (e.g., a Radio Network Temporary Identifier (RNTI)) is masked onto the CRC according to PDCCH owners or utilities.

Figure 4:
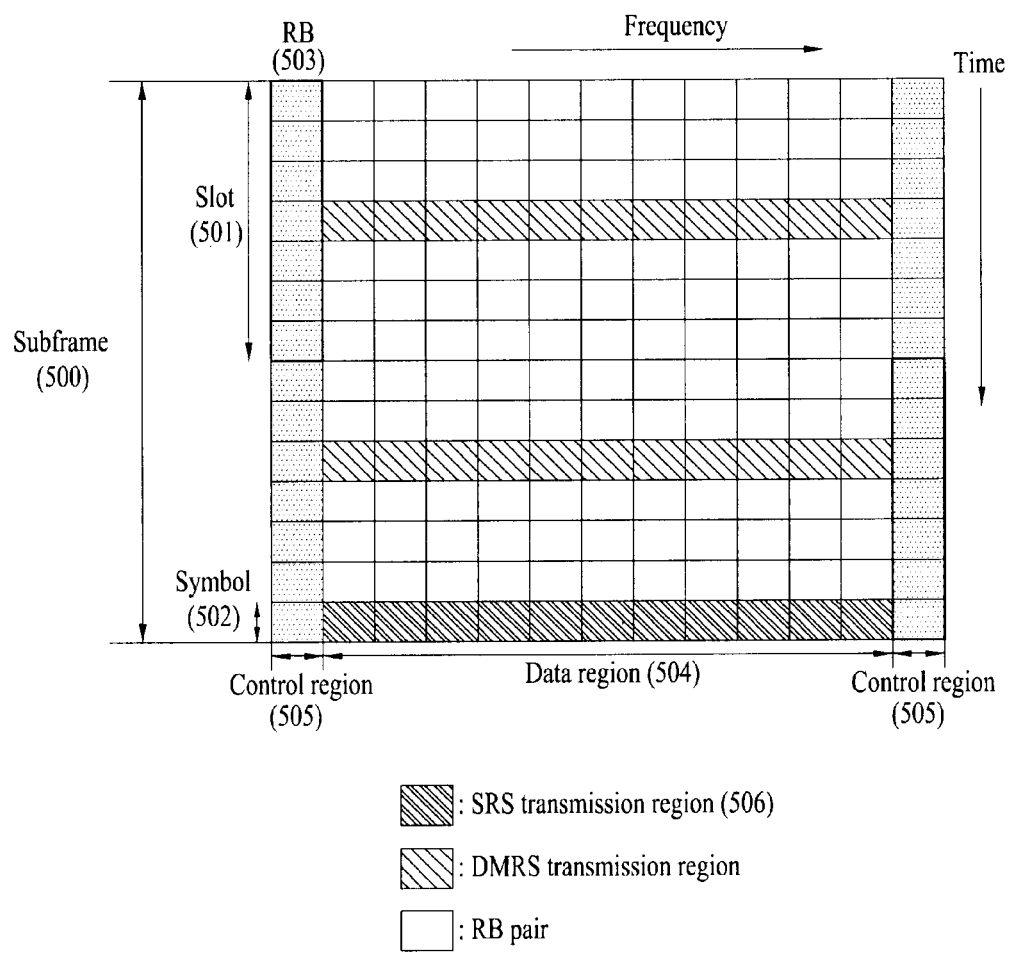
FIG. 4 exemplarily shows an uplink (UL) subframe structure for use in a system.

FIG. 4 exemplarily shows an uplink (UL) subframe structure for use in a system.

Referring to FIG. 4, a subframe 500 having a length of 1 ms, which is a basic unit of LTE uplink transmission, includes two 0.5 ms slots 501. Assuming the length of a normal Cyclic Prefix (CP), each slot includes 7 symbols 502 and one symbol corresponds to one SC-FDMA symbol. A resource block 503 is a resource allocation unit corresponding to 12 subcarriers in a frequency domain and one slot in a time domain. The structure of the LTE uplink subframe is broadly divided into a data region 504 and a control region 505. The data region refers to a series of communication resources used for transmission of data such as voice and packets transmitted to each UE and corresponds to resources except for a control region in a subframe. The control region refers to a series of communication resources used for transmission of downlink channel quality report from each UE, reception ACK/NACK for a downlink signal, uplink scheduling request, and the like. A region 506 in which Sounding Reference Signals (SRSs) can be transmitted is a duration in which an SC-FDMA symbol located at the last portion on a time axis in one subframe is present and is transmitted through a data transmission band on a frequency axis. SRSs of several UEs transmitted to the last SC-FDMA of the same subframe can be identified according to frequency positions/sequences.

Figure 5:
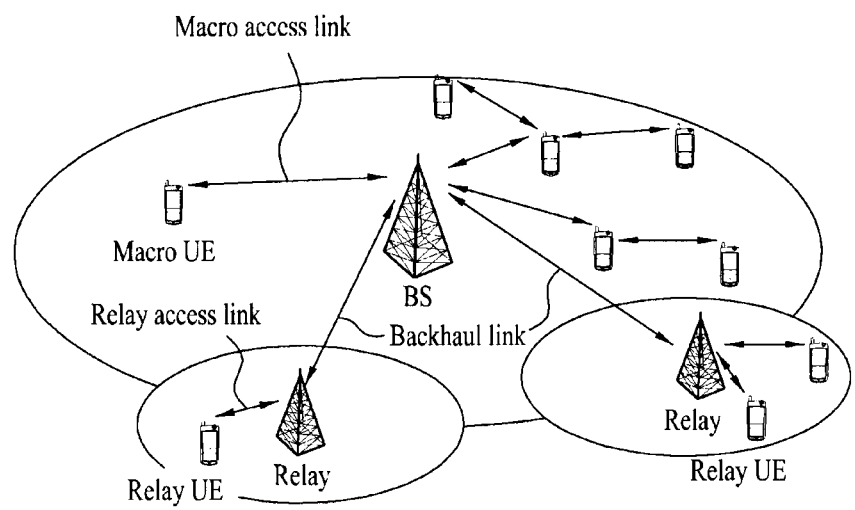
FIG. 5 exemplarily shows a wireless communication system including a relay.

FIG. 5 illustrates a wireless communication system having relays. A relay or Relay Node (RN) extends the service area of an eNB or is installed in a shadowing area to thereby provide a reliable service. Referring to FIG. 5, the wireless communication system includes an eNB, relays, and UEs. The UEs communicate with the eNB or the relays. For the sake of convenience, a UE communicating with an eNB is referred to as a macro UE and a UE communicating with a relay is referred to as a relay UE. A communication link between an eNB and a macro UE and a communication link between a relay and a relay UE are referred to as a macro access link and a relay access link, respectively. A communication link between an eNB and a relay is referred to as a backhaul link.

Relays are classified into L1 relays, L2 relays, and L3 relays according to their functionalities in multi-hop transmission. An L1 relay usually functions as a repeater. Thus, the L1 relay simply amplifies a signal received from an eNB or a UE and transmits the amplified signal to the UE or the BS. Because the L1 relay does not decode a received signal, the transmission delay of the signal is short. Despite this benefit, noise is also amplified because the L1 relay does not separate the signal from the noise. To avert this problem, an advanced repeater or smart repeater capable of UL power control or self-interference cancellation may be used. The operation of an L2 relay may be depicted as decode-and-forward. The L2 relay can transmit user-plane traffic to L2. While the L2 relay does not amplify noise, decoding increases transmission delay. An L3 relay whose operation is depicted as self-backhauling can transmit an Internet Protocol (IP) packet to L3. As it is equipped with a Radio Resource Control (RRC) function, the L3 layer serves as a small BS.

L1 and L2 relays may be regarded as part of a donor cell covered by a BS. In the case where a relay is part of a donor cell, the relay does not have its own cell ID because it cannot control its cell and UEs of the cell. Nonetheless, the relay may still have a relay ID. At least part of Radio Resource Management (RRM) is controlled by the eNB to which the donor cell belongs, while parts of the RRM may be located in the relay. An L3 relay can control cells of its own. As such, the L3 relay may manage one or more cells and each of the cells may have a unique physical-layer cell ID. The L3 relay may have the same RRM mechanism as a BS. From the perspective of a UE, there is no difference between accessing a cell controlled by the L3 relay and accessing a cell controlled by a normal BS.

Relays may be classified as follows according to mobility.
Fixed RN: as is implied from its appellation, this type of RN is permanently fixed for use in a shadowing area or for coverage extension. It may function as a simple repeater.
Nomadic RN: this type RN is temporarily installed when users are rapidly increasing in number, or is movable within a building.
Mobile RN: this RN can be installed in a public transportation vehicle such as a bus or subway car. Mobility of the RN should be supported.

The following classifications can also be considered according to links between relays and networks.

In-band connection: a network-to-relay link shares the same frequency band with a network-to-UE link in a donor cell.
Out-band connection: a network-to-relay link and a network-to-UE link use different frequency bands in a donor cell.

With respect to knowledge of existence of a relay in a UE, relays are classified as follows.
Transparent relay: a UE is not aware of whether or not it is communicating with a network via the relay.
Non-transparent relay: a UE is aware of whether or not it is communicating with a network via the relay.

Figure 6:
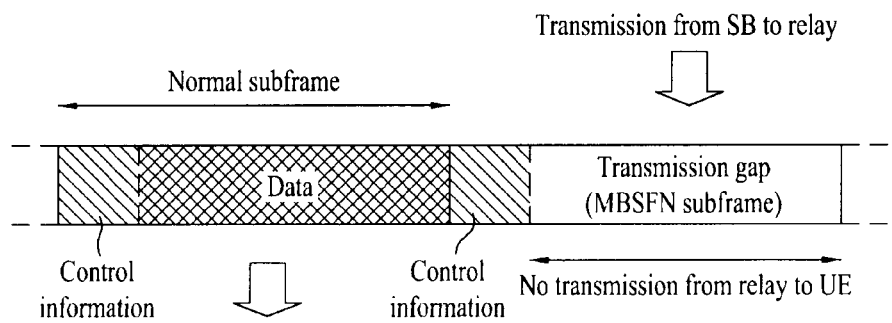
FIG. 6 is a diagram illustrating backhaul communication using a multimedia broadcast over a single frequency network (MBSFN) subframe.

FIG. 6 is a diagram showing backhaul communication using a multimedia broadcast over a single frequency network (MBSFN) subframe. In an in-band relay mode, a BS-relay link (that is, a backhaul link) and a relay-UE link (that is, a relay access link) operate in the same frequency band. If a relay transmits a signal to a UE while receiving a signal from a BS and vice versa, since a transmitter and a receiver of the relay cause interference, simultaneous transmission/reception of the relay may be prevented. In order to prevent simultaneous transmission/reception, a backhaul link and a relay access link are partitioned using a TDM scheme. In LTE-A, a backhaul link is set in an MBSFN subframe in order to support a measurement operation of a legacy LTE UE present in a relay zone (a fake MBSFN method). If an arbitrary subframe is signaled as an MBSFN subframe, since a UE receives only a control (ctrl) region of the subframe, a relay may configure a backhaul link using a data region of the subframe. For example, a relay PDCCH (R-PDCCH) is transmitted using a specific resource region from a third OFDM symbol to a last OFDM symbol of an MBSFN subframe.

Figure 7:
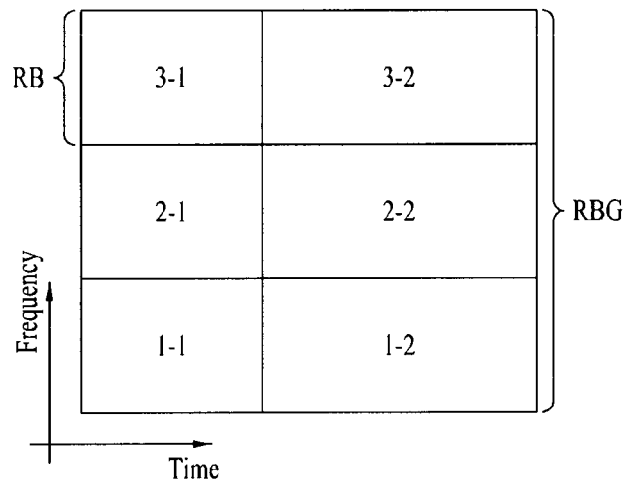
FIG. 7 is a diagram illustrating arbitrary division of frequency-time resources.

FIG. 7 is a diagram showing arbitrary division of frequency-time resources. Although FIG. 7 shows the case of using a single antenna port, the scope or spirit of the present invention is not limited thereto and can also be applied to multiple antenna ports. FIG. 7 may also show a part of a downlink subframe.

In FIG. 7, the size of a frequency-time domain denoted by X-Y may be variously configured. In an LTE system, a resource region X-1 (X=1, 2, 3) may include 12 subcarriers in a frequency domain and four OFDM symbols in a time domain. A resource region X-2 (X=1, 2, 3) may include 12 subcarriers in a frequency domain and seven OFDM symbols in a time domain. The number of symbols may be changed according to the length of a cyclic prefix. The number of symbols and the number of subcarriers may have different values according to system. In other words, the resource region X-1 may be part of a first slot and the resource region X-2 may be part of a second slot. Such resource configuration may typically appear in a backhaul subframe between a BS and a relay. In this case, FIG. 7 shows the remaining part of the MBSFN subframe of FIG. 6 except for the control information region.

FIG. 7 shows a resource block (RB) and a resource block group (RBG) in order to represent a resource size in a frequency domain. The RB is defined in slot units as shown in FIG. 2. Accordingly, X-Y corresponds to one RB and [X-1, X-2] corresponds to an RB pair. Unless specifically stated, the RB may be [X-1], [X-2] or [X-1, X-2] according to context. The RBG includes one or more contiguous RBs. Although the number of RBs configuring the RBG is 3 in FIG. 7, the number of RBs configuring the RBG may be changed according to system bandwidth as shown in Table 3. The RB means a PRB or a VRB.

Hereinafter, how control information and data are allocated and transmitted in the resource configuration shown in FIG. 7 will be described. Unless specifically stated, a single antenna port will be focused upon and a resource region is represented by the method of FIG. 7, for convenience of description. It is apparent to those skilled in the art that the description of the single antenna port is applicable to multiple antenna ports.

Control information (e.g., R-PDCCH) used in a link between a BS and a relay is preferably transmitted in a predetermined specific resource region. In one example of the present invention, if Type 0 RA of LTE is used, a specific resource region (which is referred to as an R-PDCCH search space) in which control information may be transmitted may be restricted to K-th RBs of allocated RBG(s). Here, K denotes an integer less than the number of RBs configuring an RBG. In this case, the K-th RBs of all allocated RBGs may transmit an R-PDCCH. K may be a first RB or a last RB of an RGB group. Even in Type 1 or 2 RA, the concept of the RBG may be used and a specific RB of an RBG may be used as a resource region for R-PDCCH transmission in the tautological sense.

In addition, a method of separating RB(s) for the R-PDCCH search space from each other by the square of P within the RBG set if the R-PDCCH search space is set to one subset of an RBG set is proposed. Here, P is the number of RBs within an RBG. For example, assuming that the number of RBs is 32, 11 RBGs may be defined and one RBG may include three RBs (P=3). Accordingly, the RBs for the R-PDCCH search space may be placed at an interval of $3^2=9$ RBs. The above-described example corresponds to the case in which one RBG subset is used and an interval of RBs within the subset is the square of P if the number of RBG subsets is 2. The interval between subsets may be changed depending on how many subsets are selected.

R-PDCCH/(R-)PDSCH Allocation and Demodulation

Control information is transmitted via an R-PDCCH and data is transmitted via an (R-)PDSCH. The R-PDCCH is roughly classified into two categories. One category is DL grant (DG) and the other category is UL grant (UG). The DL grant contains information about time/frequency/space resources of the R-PDSCH corresponding to data which should be received by a relay and information (scheduling information) for decoding. The UL grant contains information about time/frequency/space resources of the R-PUSCH corresponding to data which should be transmitted by a relay in uplink and information (scheduling information) for decoding. Hereinafter, a method of placing DL/UL grant in a resource region of a backhaul subframe and demodulating the DL/UL grant will be described.

Figure 8:
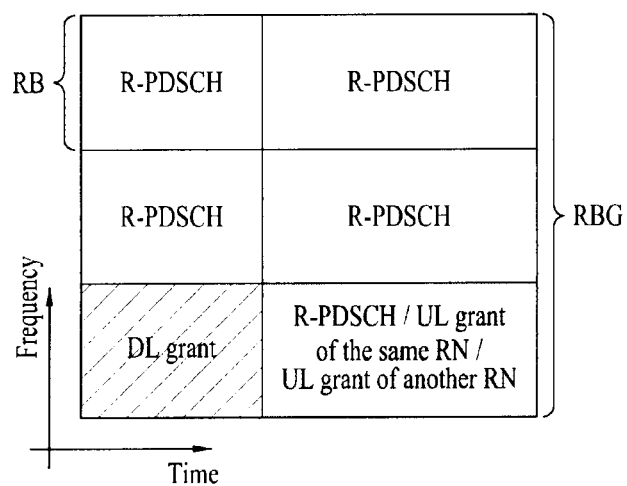
FIGS. 8 to 10 are diagrams illustrating examples of arranging and demodulating an R-PDCCH/(R-)PDSCH.

FIG. 8 shows an example of placing and demodulating an R-PDCCH/(R-)PDSCH. In this example, it is assumed that resources for the (R-)PDSCH are allocated using Type 0 RA (RBG unit allocation) of the LTE. However, this example is merely exemplary and is equally/similarly applied to even the case in which Type 1 RA (RB unit allocation) of LTE is used. Although the case in which an RBG including DL grant is allocated to a relay is shown in FIG. 8, this is merely exemplary and the RBG including DL grant may not be allocated to the relay.

FIG. 8 shows the case in which (a) data ((R-)PDSCH) is present, (b) UL grant is present, or (c) UL grant for another relay is present in a resource region 1-2 in the case in which DL grant of RN#1 is present in a resource region 1-1.

In FIG. 8, a determination as to which information of (a) to (c) is present in the resource region 1-2 may be made using RA information (e.g., RBG or RB allocation information). For example, if all RBGs are allocated to RN#1, RN#1 may interpret RA information of DL grant and determine whether the resource region 1-2 corresponds to (a) or (b). More specifically, if data is present in an RB or an RBG in which a first R-PDCCH (e.g., DL grant) thereof is detected is present in the resource region X-1, RN#1 may assume that data thereof is present in resources other than resources occupied by the first R-PDCCH. Accordingly, if RA information indicates that data is present in the RB or RBG, RN#1 may determine that another R-PDCCH is not present in the RB or RBG except for DL grant. That is, the relay may determine that the resource region 1-2 corresponds to (a). If the RA information indicates that data is not present in the RB or RBG, the relay may determine that a second R-PDCCH is present as in (b) or (c) and detect an appropriate data start point (e.g., a resource region 2-1). At this time, the BS and the relay may assume that the size of the second R-PDCCH is constant. In case of (c), by attempting CRC detection based on an RN ID, it may be determined that the second R-PDCCH is not UL grant for RN#1. Although RA information is used to distinguish among (a), (b) and (c), it may be implicitly set that the RBG including DL grant is always resources allocated for data of RN#1 in advance.

Although FIG. 8 shows the case in which DL grant is present in the whole resource region X-1 (e.g., 1-1), this is merely exemplary and the above-described method may be equally applied to the case in which DL grant is present in a part of the resource region 1-1. Although FIG. 8 shows the case in which DL grant is present in the resource region X-1, UL grant may be present in the resource region X-1 instead of DL grant. In this case, the relay may first decode UL grant instead of DL grant. Although the second R-PDCCH is UL grant in FIG. 15, this is merely exemplary and the second R-PDCCH may be DL grant.

Figure 9:
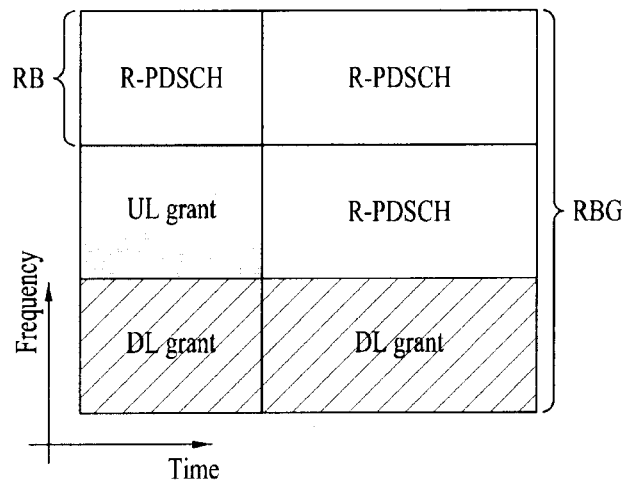
Figure 10:
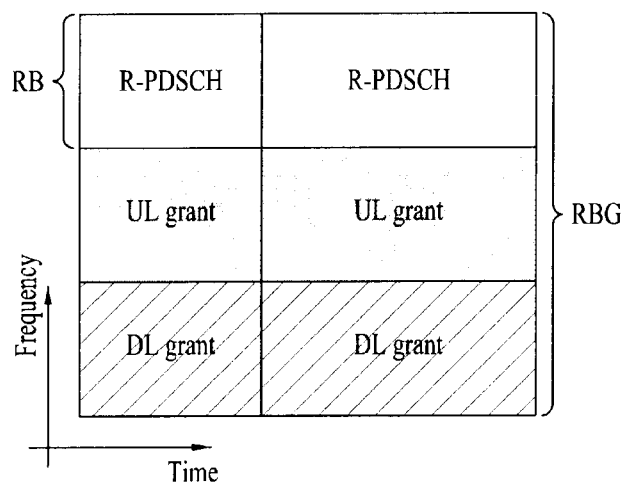

FIGS. 9 and 10 show other examples of placing and demodulating an R-PDCCH/(R-)PDCCH. In this example, it is assumed that resources for the (R-)PDSCH are allocated using Type 0 RA (RBG unit allocation) of LTE. However, this example is merely exemplary and is equally/similarly applied to even the case in which Type 1 RA (RB unit allocation) of LTE is used. Although the case in which an RBG including DL grant is allocated to a relay is shown in FIGS. 9 and 10, this is merely exemplary and the RBG including DL grant may not be allocated to the relay.

FIGS. 9 and 10 show the case in which (a) data ((R-)PDSCH) is present in the resource region 2-1/2-2 (not shown), (b) UL grant for RN#1 is present in the resource region 2-1 (FIG. 9), or (c) UL grant for RN#1 is present in a resource region 2-1/2-2 (FIG. 10), in the case in which DL grant for RN#1 is present in the resource region 1-1/1-2.

In this case, RN#1 performs blind decoding so as to distinguish among (a), (b) and (c). Data or control information of RN#1 is preferably present in the resource region 2-X.

In addition, RN#1 may distinguish among (a), (b) and (c) using RA information (e.g., RBG allocation bit) of the DL grant. For example, RN#1 may determine whether data of RN#1 or UL grant restrictively allocated to the resource region 2-1 is present in the resource region 2-1 using RA information (that is, (a) or (b)) (case A). In addition, RN#1 may determine whether data of RN#1 or UL grant restrictively allocated to the resource region 2-1/2-2 is present in the resource region 2-1/2-2 using RA information (that is, (a) or (c)) (case B). The base station-relay operation is set to one of case A or case B. That is, RN#1 may distinguish between (a) and (b) or (a) and (c) using RA information (e.g., RBG allocation bit). The RBG allocation bit indicating which of (a) and (b) or (a) and (c) is used is set in advance. For example, it is assumed that UL grant is restricted to the resource region 2-1 or the resource region 2-1/2-2 in advance.

In addition, in the case in which DL grant for RN#1 is present in the resource region 1-1/1-2, (a) data of RN#1 is present in the resource region 2-1/2-2 (not shown), (b) DL or UL grant for another RN is present in the resource region 2-1 (FIG. 9), or (c) DL or UL grant for another RN is present in a resource region 2-1/2-2 (FIG. 10). In this case, (a) and (b) or (a) or (b) may be distinguished using the RBG allocation bit. A determination as to which of (a) and (b) or (a) and (c) is used should be set using the RBG allocation bit in advance.

In the above-described method, assuming that only the same DL/UL grant size as the DL grant size is present, the RBG allocation bit is used to determine whether the value present in the resource region 2-1 or 2-1/2-2 is data or control information and the size of the DL/UL grant (that is, the resource region 2-1 or 2-1/2-2) may be determined according to the size of the detected DL grant.

The above-described method is equally applied to the case in which DL grant is present in the resource regions 1-1, 1-2 and 1-3. The above-described method is equally applied to the case in which all or part of the UL grant is present in the resource regions 1-1, 2-1 and 3-1 instead of DL grant. In this case, in the above-described method, the relay first blind-decodes UL grant instead of DL grant.

R-PDCCH Mapping and Detection in Case of High Aggregation Level

Figure 11:
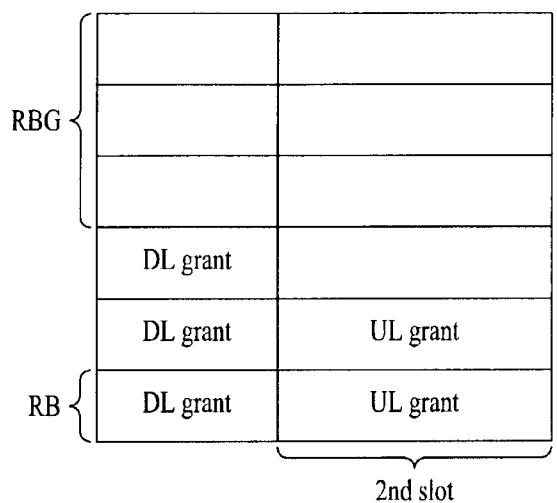
FIGS. 11 to 14 are diagrams illustrating other examples of arranging and demodulating an R-PDCCH/(R-)PDSCH.

In the relay, an R-CCE aggregation level (e.g., 1, 2, 4, 8, . . . ) of an R-PDCCH may be changed according to channel environment. This is similar to a CCE set of an LTE PDCCH. The R-CCE is defined in order to represent a CCE for a relay, for convenience. In the following description, R-CCE and CCE are used interchangeably, and the R-CCE structure may borrow a CCE structure of the legacy LTE or may be newly defined as necessary. It is assumed that DL grant of the R-PDCCH is present in three RBs as shown in FIG. 11 and UL grant is transmitted in a second slot of two RB pairs. In this case, when DL grant is blind-decoded to check R-CCE aggregation shown in FIG. 11, the relay may not be aware of whether UL grant or data is present in the second slot.

It is possible to indicate whether UL grant is present in the second slot using an RBG allocation bit. Preferably, it may be assumed that an RBG including a DL grant is allocated to the corresponding relay. Therefore, if DL grant is present in a first slot, a resource allocation bit of the RBG may indicate whether an R-PDSCH or UL grant is present in a second slot. The following cases are possible.

(a) Presence of the R-PDSCH in the second slot, or (b) Presence of UL grant for a relay or UL grant for another relay in the second slot. UL grant of another RN may be CRC checked using an RN ID.

It is necessary to determine where RB(s) UL grant is present. The number of RB pairs including UL grant may be changed according to R-CCE aggregation level.

The number/positions of RB pairs including UL grant may be checked by generating a simple relationship between a DL grant size and a UL grant size, which will be described with reference to FIGS. 12 and 13.

Figure 12:
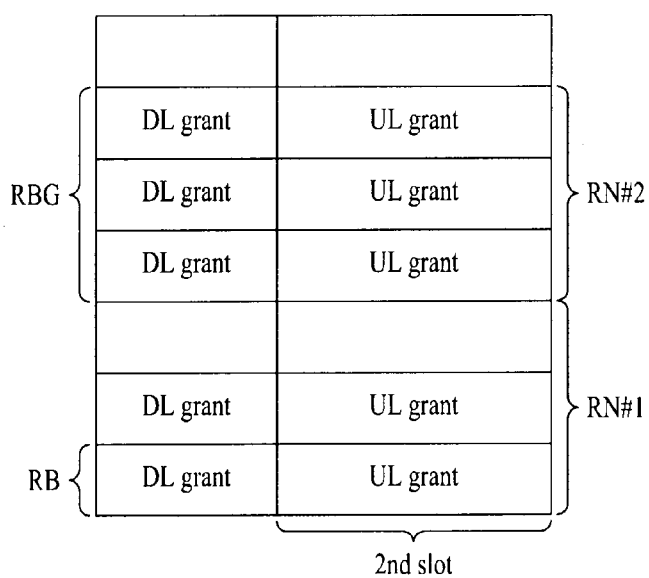

Referring to FIG. 12, UL grant may always be present in an RB pair including DL grant. Accordingly, if DL grant is present in two RB pairs, UL grant may be equally present in two RB pairs. Accordingly, if DL grant is successfully detected, the relay may check where UL grant is present. At this time, the aggregation level of UL grant may be set to be greater than the aggregation level of DL grant. Alternatively, it may be defined that a difference between the aggregation level of DL grant and the aggregation level of UL grant is N_level in advance.

In one embodiment, it may be defined that one R-CCE is present in a first slot of an RB pair and two R-CCEs are present in a second slot. In this case, the R-CCE of the first slot and the R-CCE of the second slot are different in size. According to the present example, it may be defined that the aggregation level of DL grant×2=the aggregation level of UL grant in advance. Referring to FIG. 12, the aggregation level of DL grant for RN#1 is 1 and the aggregation level of UL grant is 4. Similarly, the aggregation level of DL grant for RN#2 is 3 and the aggregation level of UL grant is 6.

As another example, it may be defined that an R-CCE size may be defined in slot units. That is, one R-CCE is present in a first slot of an RB pair and one R-CCE is present in a second slot. In this case, the R-CCE of the first slot and the R-CCE of the second slot are different in size. According to this example, it may be defined that the aggregation level of DL grant=the aggregation level of UL grant in advance. Referring to FIG. 12, in case of RN#1, the aggregation level of DL grant=the aggregation level of UL grant=2. Similarly, in case of RN#2, the aggregation level of DL grant=the aggregation level of UL grant=3.

Figure 13:
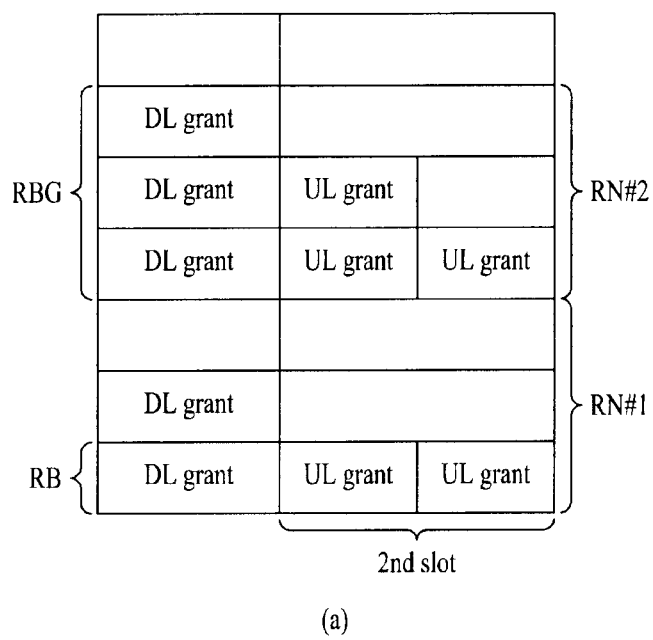
Figure 13:
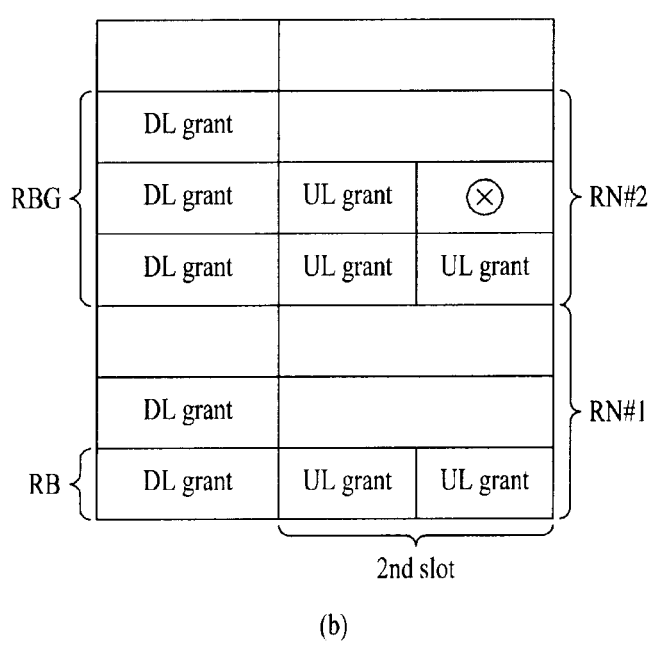

Referring to FIG. 13, an R-CCE size is set to 1 and the aggregation level of DL grant is equal to the aggregation level of UL grant. For example, the R-CCE size may be 32 REs. In this case, since the resource region of the second slot is larger, the placement shown in FIG. 13 is obtained. In case of RN#2, only some resources of the second slot of the second RB pair are used to transmit UL grant. In this case, an empty space of the second slot may be used to transmit data (FIG. 13(*a*)) or may not be used to transmit data (FIG. 13(*b*)).

As another method, the number of RBs occupied by UL grant may be restricted. For example, as in the case of RN#1 of FIG. 13, there is a restriction that UL grant may always be transmitted in the second slot of one RB pair. Such a restriction may be fixed in the standard and may be transmitted from a BS to an RN through a higher layer signal. If such a restriction is present, the RN may easily check the position of the region occupied by UL grant by reinterpreting the above-described RA information and thus check the position of a data signal.

In the above description, the RBG allocation bit may be reinterpreted and used to distinguish between UL grant and data (R-PDSCH) because of the assumption that the RBG is used only for the RN. However, if the RBG is used as original meaning thereof, a separate signal may be generated. Such a signal may be present in the R-PDCCH. A determination as to whether a separate signal is used or the RBG is reinterpreted and used may be set in advance or may be configured through semi-static signaling.

If decoding of UL grant fails in spite of indicating that UL grant is present in the above-described methods, data (including UL grant) present in the slot may be combined with data retransmitted via HARQ. In this case, since serious error may be generated in HARQ-combined data due to UL grant, previous data which may be included in UL grant may not be used in a HARQ combining process.

Figure 14:
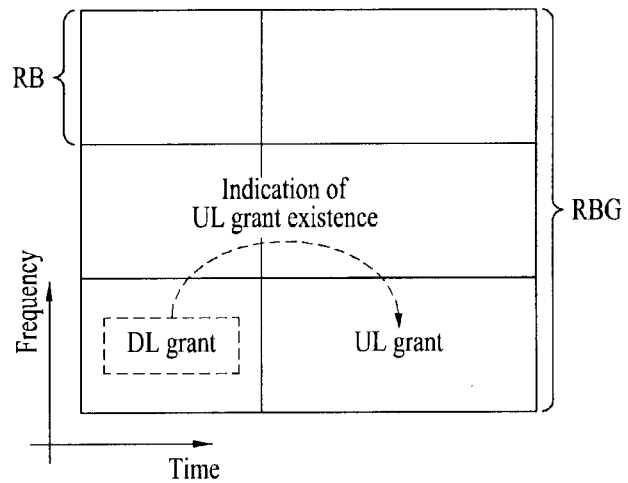

FIG. 14 shows a method of enabling DL grant to indicate presence of UL grant in a second slot by locating DL grant in a first slot even when only UL grant is present.

Referring to FIG. 14, even in the case in which there is no downlink data (e.g., (R-)PDSCH) to be transmitted from a BS to an RN (that is, UL grant only case), null DL grant (or dummy DL grant) may be transmitted in order to inform the RN that UL grant is present in the second slot of the same RB pair. According to the present example, regardless of presence/absence of downlink data for the RN, blind decoding for UL grant may be omitted and thus blind decoding complexity of the RN is reduced. In the case in which both DL grant and UL grant are transmitted but there is no downlink data for the RN as in this example, it should be indicated that there is no data corresponding to DL grant (that is, null DL grant). Therefore, null DL grant may indicate that all downlink transport blocks or codewords are disabled. In addition, null DL grant may indicate that a downlink transport block size (TBS) is TBS=0 or TBS<K (e.g., 4 RBs). In addition, null DL grant may indicate that there is no RB allocated for downlink transmission. In addition, a specific field within null DL grant may be set to "0" or "1". If null DL grant is detected, the relay interprets that data corresponding to null DL grant is not transmitted and checks presence of UL grant in the second slot from null DL grant.

Figure 15:
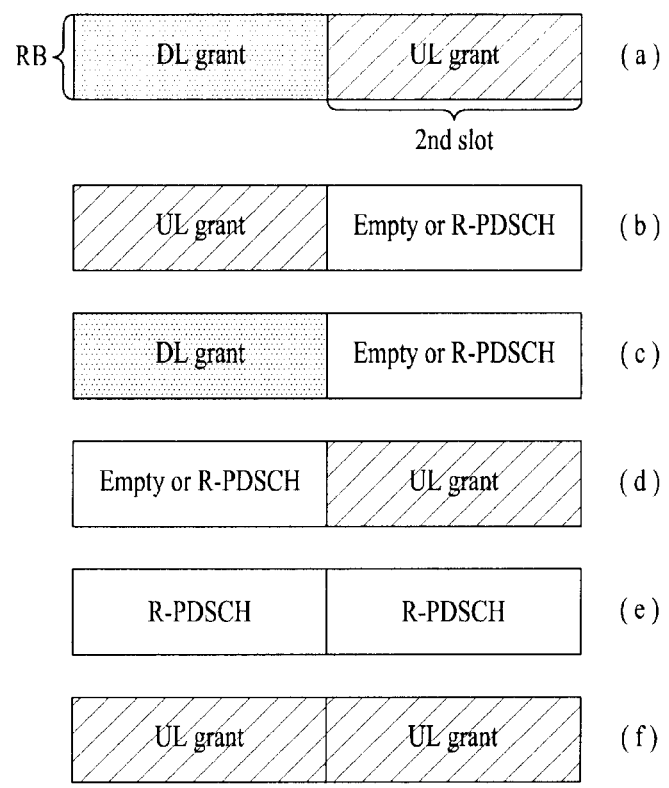
FIG. 15 is a diagram illustrating one example of arranging and a DL grant and/or UL grant.

FIG. 15 is a diagram showing a method for arranging DL grant, UL grant, (R-)PDSCH or a combination thereof within each slot. It is assumed that the DL grant is present only in the first slot.

FIG. 15(a) shows an exemplary case in which a UL grant is located behind a DL grant within an RB pair. FIG. 15(b) shows an exemplary case in which a UL grant is present in the first slot, and the second slot may be empty or be used to transmit (R-)PDSCH. FIG. 15(b) further shows the case of a UL grant alone. The UL grant alone means that only a UL grant is present in the corresponding subframe and a DL grant is not present in the same subframe.

FIGS. 15(c) and 15(d) exemplarily show that the positions of a DL grant and a UL grant are fixed. As can be seen from FIGS. 15(c) and 15(d), the DL grant may be fixed to a first slot, and the UL ( 상향 DL링 ) grant may be fixed to a second slot. However, this example is merely example, and the positions of DL grant and UL grant may be opposed to those of FIGS. 15(c) and 15(d). In FIG. 15(c), if the UL grant is not present in the second slot of the RB pair, a resource of the second slot may be empty or may include (R-)PDSCH. Similarly, as shown in FIG. 15(d), if a DL grant is not present in the first slot of the RB pair, a resource of the first slot may be empty or may include (R-)PDSCH. FIG. 15(c) may include the concept of DL grant alone, and FIG. 15(d) may include the concept of UL grant alone.

FIG. 15(e) is a diagram illustrating that (R-)PDSCH is transmitted at both a first slot and a second slot. That is, R-PDCCH transmission is not performed in both the first slot and the second slot of the RB pair. FIG. 15(f) is a diagram illustrating that R-PDCCH transmission is performed in both the first slot and the second slot of the RB pair. Although FIG. 15 exemplarily shows that a UL grant is transmitted in the RB pair, it should be noted that a DL grant may also be transmitted in the RB pair as necessary. The above-mentioned DL or UL grant alone concepts may be collected and configured as shown in FIG. 15(f). While the above-mentioned structure can be configured as a dedicated search space, it should be noted that the above-mentioned structure may also be configured as a common search space as necessary.

FIGS. 15(a) to 15(f) exemplarily show various methods for arranging R-PDCCH and (R-)PDSCH in a backhaul subframe. All or some sets of FIGS. 15(a) to 15(f) may be actually used for R-PDCCH/(R-)PDSCH transmission. For example, FIGS. 15(a) and 15(b), FIGS. 15(a), 15(c) and 15(d), FIGS. 15(a), 15(b), 15(c) and 15(d), FIGS. 15(a), 15(b) and 15(f), and FIGS. 15(c) and 15(d), etc. may be used as necessary.

If the positions of DL grant and UL grant are fixed as shown in FIGS. 15(c) and 15(d), blind decoding (BD) is performed only for the corresponding grant at the corresponding position, so that a waste of resources may occur whereas BD complexity is reduced. For example, if only the UL grant is present in FIG. 15(d), a resource of the first slot of the RB pair may not be used. In order to overcome the problems (i.e., in order to efficiently utilize resources), the UL grant may also be located at the first slot of the RB pair as shown in FIG. 15(b). Needless to say, the UL grant may also be located at the second slot of the RB pair as necessary. Generally, an available resource of the first slot of a backhaul link is less than that of the second slot of a backhaul link. Therefore, the size of a UL grant located at the first slot may be different from the size of another UL grant located at the second slot. In other words, a DCI format may be changed to another. Alternatively, although the same DCI format is used, an R-CCE aggregation level of the UL grant may be changed according to a slot. For example, whereas the UL grant is transmitted at an R-CCE aggregation level of 1 in the first slot, the UL grant is transmitted at an R-CCE aggregation level of 2 in the second slot, because the number of available REs of the second slot is about two times the number of available REs of the first slot.

Blind decoding (BD) complexity for R-PDCCH reception according to DL/UL grant arrangement will hereinafter be described. For convenience of description, BD complexity will be described with reference to FIGS. 15(a) and 15(b). A relay or a relay node (RN) performs BD of a DCI format for a DL grant (hereinafter referred to as a DL grant DCI format) at a first slot, and performs BD of a DCI format for a UL grant (hereinafter referred to as a UL grant DCI format) at a fifth slot. BD of a UL grant at the first slot may be limited to the case in which a DL grant is not detected in the first slot. Thereafter, the relay or RN performs BD of the UL grant in the second slot. Similarly, BD of a UL grant at the second slot may be limited to the case in which a UL grant is not detected in the first slot. BD complexity encountered when the UL grant is located at the first slot is higher than BD complexity encountered when the position of DL grant and UL grant are fixed as shown in FIGS. 15(c) and 15(d).

Therefore, in order to reduce BD complexity, if the Ul grant is located at the first slot, it is preferable that the size of a UL grant (DCI format) be adjusted to be equal to the size of a DL grant (DCI format). If the number of bits of UL grant is insufficient, a dummy bit is padded to UL grant control information, so that two DCI formats may have the same information size. The size of UL grant is adjusted to be equal to the size of UL grant, and the resultant DL/UL grants are blind-decoded, so that DL grant and/or UL grant can be detected from the first slot. For example, DCI format 2x (DL grant for MIMO) is adjusted to be equal to DCI format 4 (UL grant for MIMO), and the resultant DCI formats can also be transmitted to the first slot. If DCI format 2x and DCI format 4 have different sizes, a dummy bit such as zero padding is added so that DCI format 2x and DCI format 4 may have the same size.

DCI size unification of DL/UL grants may be restricted to the case in which the UL grant is located at the first slot. That is, although the same-format UL grant is used, the size of UL grant may be changed according to a slot. In more detail, if the UL grant is located at the first slot, the size of UL grant is adjusted to be equal to the size of DL grant (for example, the size of UL grant may be increased). If the UL grant is located at the second slot, the size of UL grant may be predefined and used. In addition, UL grant can be transmitted at a higher R-CCE aggregation level at the second slot as compared to the case in which UL grant is located at the first slot. If UL/DL grants may have the same size at the first slot, it is possible to use a method for allocating an N-bit indicator (e.g., N=1) (for example, a format indication field) discriminating between a UL grant and a UL grant to a DCI format so as to determine if the detected DCI format is used for a DL grant or a UL grant. In addition, R-PDCCH of the first slot may be differently masked or scrambled according to a DCI format, such that a DL grant can be distinguished from a UL grant. For example, DL grant and UL grant are CRC-masked with different identification (ID) information (e.g., RNTI), so that the same-size DL/UL grants can be distinguished from each other in the first slot. In this case, the relay or RN does not separately perform blind decoding (BD) for receiving R-PD-CCH at the first slot according to a DL grant or UL grant. Instead of the above operation, after the relay or RN performs one BD at the first slot, the relay or RN performs masking using different ID information (e.g., RNTI), so that DL grant and UL grant can be distinguished from each other. On the other hand, if UL grant is located at the second slot, the size of UL grant need not be equal to that of DL grant. That is, UL grant DCI format appropriate for the size of a resource of the second slot, or R-CCE aggregation level may be used (e.g., DCI format 4 or high R-CCE aggregation level).

In brief, the UL grant DCI format size is adjusted to be equal to the DL grant DCI format size when UL grant is located at the first slot, so that the number of BD times can be reduced. On the other hand, assuming that UL grant is located at the second slot, the proper-sized UL grant DCI format can be configured according to available resources (e.g., the number of REs) and REG/R-CCE definition without limitation.

FIG. 16 exemplarily shows UL grant (format 0) and DL grant (format 1A) according to slots. FIGS. 16(a) and 16(b) are diagrams showing that DL/UL grant DCI formats are located at the first slot, and FIG. 16(c) is a diagram showing that UL grant DCI format is located at the second slot.

Referring to FIGS. 16(a) and 16(b), in order to intentionally equalize the size of DL grant DCI format and the size of UL grant DCI format, a zero padding (ZP) bit (or field) may be added to UL grant DCI format. In addition, assuming that DL/UL grant DCI formats have the same size at the first slot, DL/UL grant distinction may be achieved using a format indication field (0/1A field) contained in DCI format. In contrast, DL/UL grant distinction may be achieved using the masking or scrambled value (or a code, a sequence) applied to R-PDCCH. For example, in case of DL grant DCI format, CRC may be scrambled using 'A RNTI'. In case of UL grant DCI format, CRC may be scrambled using 'B RNTI' (e.g., A RNTI+N, A RNTI*N). In this case, a format indication field (0/1A field) contained in DCI format may be used for other purposes. For example, a format indication field (0/1A field) contained in DCI format may be used to indicate the presence or absence of UL grant in the second slot. Similarly, assuming that DL/UL grants are distinguished from each other using the format indication field (0/1A field) in the first slot, the presence of UL grant in the second slot may be indicated using the masking or scrambled value (or a code, a sequence) applied to R-PDCCH of the first slot. For example, if UL grant is not present in the second slot, CRC for R-PDCCH of the first slot may be scrambled using 'A RNTI'. If UL grant is present in the second slot, CRC for R-PDCCH of the first slot may be scrambled using 'B RNTI' (e.g., A RNTI+N, A RNTI*N).

The above-mentioned DCI format structures are disclosed for illustrative purposes only, and can also be modified in various ways as necessary. For example, the RA bit field is reduced than that of FIG. 16 due to unique characteristics of the relay channel, so that the same-size UL/DL grants may be generated. In addition, the DL/UL grant DCI format of the first slot may have the same size and the same field structure. In accordance with DL grant or UL grant, the DCI format field may be interpreted in different ways. In addition, a new field for DL/UL grant DCI format may be configured as necessary.

Referring to FIG. 16(c), if UL grant is located at the second slot, the size of UL grant DCI format need not be equal to that of DL grant DCI format. Accordingly, if UL grant is located at the second slot, the proper-sized UL grant DCI format may be configured in response to available resources (e.g., the number of REs) and REG/R-CCE definition without restriction of DCI format size unification. For example, the zero padding (ZP) bit may be omitted from the structure of FIG. 16(b). Compared to the structure of FIG. 16(b), the format indication field (0/A field) may be omitted as necessary. In addition, the UL grant DCI format of the second slot may be CRC-masked using the same RNTI as that of DL grant.

The DCI formats shown in FIG. 16 are disclosed for illustrative purposes only, and DCI formats 2~4 can also be applied to the present invention without departing from the scope or spirit of the present invention. DCI format 2 may be used to schedule (R-)PDSCH in a spatial multiplexing mode. DCI format 3 may be used to carry Transmit Power Control (TPC) for (R-)PUCCH/(R-)PUSCH. DCI format 4 may be used to schedule (R-)PUSCH in UL MIMO. Basically, the above-mentioned DCI format sizes may be independently used according to their usages, system configuration (e.g., bandwidth, etc.).

Figure 17:
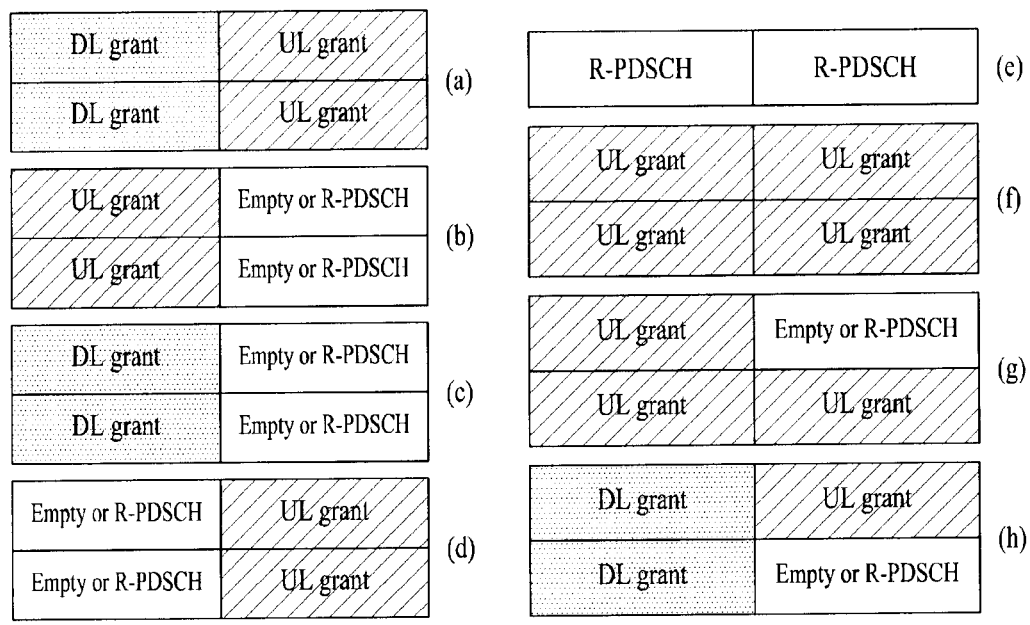
FIG. 17 is a diagram illustrating another example of arranging and a DL grant and/or UL grant.

FIG. 17 exemplarily shows a method for arranging DL grant and UL grant at a higher aggregation level as compared to FIG. 15. Although (R-)CCE aggregation level of FIG. 17 is different from that of FIG. 15, the remaining concepts of FIG. 17 are equal or similar to those of FIG. 15, and detailed information of FIG. 17 may be described with reference to FIGS. 15 and 16. Compared to FIG. 15, the aggregation level of FIG. 15(f) may be modified into that of FIG. 17(g), and the aggregation level of FIG. 15(a) may be modified into that of FIG. 17(h).

In accordance with the above-mentioned embodiments, it is not always necessary for first and second resource regions of the RB pair to be distinguished from each other on the basis of a slot. For example, a boundary between DL grant and UL grant shown in FIG. 15(a) need not always be set to a slot, and DL grant may be extended to an $N^{th}$ symbol (e.g., a second symbol) of the second slot as necessary. In this way, the boundary between resource regions may be established in various ways.

In addition, one or more UL grants (for example, two UL grants) may be located at the second slot. The number of UL grants may be changed according to how the boundary of resources is configured. In case of an example in which the slot is used as a resource boundary, an aggregation level of a UL grant located at the second slot of the RB pair may be considered to be 2.

The above description focuses upon a relationship between a base station (BS) and a relay node (RN), but is equally/similarly applied to a relationship between an RN and a user equipment (UE). For example, if the above description is applied to a relationship between a BS and an RN, in the above description, an RN may be replaced with a UE. In addition, the above description is applied to a relationship between an RN and a BS, a BS may be replaced with an RN and an RN may be replaced with a UE.

Figure 18:
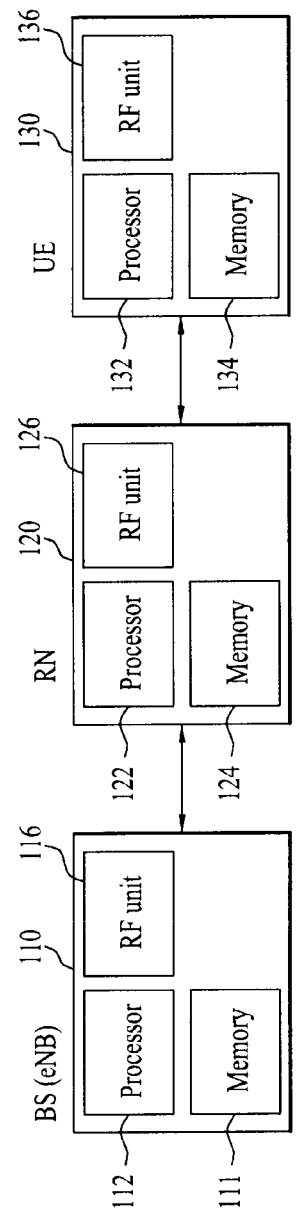
FIG. 18 is a block diagram illustrating a base station (BS), a relay node (RN), and a user equipment (UE) applicable to embodiments of the present invention.

FIG. 18 is a block diagram illustrating a base station (BS), a relay and a user equipment (UE) applicable to embodiments of the present invention.

Referring to FIG. 18, the wireless communication system includes a base station (BS) 110 (also denoted by 'eNB'), a relay node (RN) 120 and a UE 130. Although FIG. 16 exemplarily shows a UE connected to the RN for convenience of description, it should be noted that the UE may be connected to the BS.

The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The RN 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The UE 130 includes a processor 132, a memory 134, and an RF unit 136. The processor 132 may be constructed to implement the procedures and/or methods disclosed in the embodiments of the present invention. The memory 134 may be connected to a processor 132, and store various information related to operations of the processor 132. The RF unit 136 is connected to the processor 132, and transmits and/or receives RF signals. The BS 110, the RN 120 and/or the UE 130 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB). In other words, it will be apparent that various operations performed for communication with the UE in the network which includes a plurality of network nodes along with the BS (or eNB) can be performed by the BS or network nodes other than the BS (or eNB). The term BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be executed by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all changes which come within the equivalent scope of the invention are within the scope of the invention.

INDUSTRIAL APPLICABILITY

Exemplary embodiments of the present invention can be applied to wireless communication systems such as a UE, a relay node (RN), and a BS (or eNB).

The invention claimed is:

1. A method for receiving a downlink signal in a wireless communication system, the method comprising:
    receiving a subframe including two slots;
    performing blind decoding (BD) of a plurality of Relay Physical Downlink Control Channel (R-PDCCH) candidates so as to receive control information in a search space of a first slot; and
    if the R-PDCCH is detected in the search space, determining whether the R-PDCCH carries either control information for downlink transmission or control information for uplink transmission based on which Radio Network Temporary Identifier (RNTI) is masked to a Cyclic Redundancy Check (CRC) of the R-PDCCH,
    wherein a RNTI allocated for the control information for downlink transmission is different from a RNTI allocated for the control information for uplink transmission, and
    wherein the control information for downlink transmission is the same size as the control information for uplink transmission.

2. The method according to claim 1, wherein the control information for downlink transmission and the control information for uplink transmission are distinguished from each other by indication information contained in downlink control information (DCI).

3. The method according to claim 1, further comprising:
    if the control information for uplink transmission is not detected in the first slot, performing blind decoding (BD) of a plurality of R-PDCCH candidates so as to receive the control information for uplink transmission in a search space of a second slot.

4. A communication device configured to receive downlink signals in a wireless communication system comprising:
    a radio frequency (RF) unit; and
    a processor,
    wherein the processor:
        receives a subframe including two slots;
        performs blind decoding (BD) of a plurality of Relay Physical Downlink Control Channel (R-PDCCH) candidates so as to receive control information in a search space of a first slot; and if the R-PDCCH is detected in the search space, determines whether the R-PDCCH carries either control information for downlink transmission or control information for uplink transmission based on which Radio Network Temporary Identifier (RNTI) is masked to a Cyclic Redundancy Check (CRC) of the R-PDCCH, wherein a RNTI allocated for the control information for downlink transmission is different from a RNTI allocated for the control information for uplink transmission, wherein the control information for downlink transmission is the same size as the control information for uplink transmission.

5. The communication device according to claim 4, wherein the control information for downlink transmission and the control information for uplink transmission are distinguished from each other by indication information contained in downlink control information (DCI).

6. The communication device according to claim 4, wherein, if the control information for uplink transmission is not detected in the first slot, the processor performs blind decoding (BD) of a plurality of R-PDCCH candidates so as to receive the control information for uplink transmission in a search space of a second slot.

\* \* \* \* \*